United States Patent
Nakajima et al.

(10) Patent No.: US 6,883,738 B2
(45) Date of Patent: Apr. 26, 2005

(54) SPINNING REEL HANDLE ASSEMBLY (75) Inventors: Hideki Nakajima, Sakai (JP); Ken'ichi Sugawara, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/413,532

(22) Filed: Apr. 15, 2003

(65) Prior Publication Data

US 2003/0205637 A1 Nov. 6, 2003

(30) Foreign Application Priority Data

May 1, 2002 (JP) .................................. 2002-130062
Oct. 23, 2002 (JP) .................................. 2002-308463

(51) Int. Cl.$^7$ .......................................... A01K 89/015
(52) U.S. Cl. ................................... 242/282; 242/249
(58) Field of Search .............................. 242/282–284, 242/249; 74/545

(56) References Cited

U.S. PATENT DOCUMENTS

| | | | | | |
|---|---|---|---|---|---|
| 2,981,495 A | * | 4/1961 | King | ............................ | 242/265 |
| 4,369,930 A | * | 1/1983 | Noda | ............................ | 242/282 |
| 4,775,113 A | * | 10/1988 | Emura et al. | ................ | 242/268 |
| 5,381,979 A | * | 1/1995 | Furomoto | .................... | 242/224 |
| 5,690,289 A | * | 11/1997 | Takeuchi et al. | ............. | 242/282 |
| 6,095,008 A | * | 8/2000 | Hitomi | ......................... | 74/446 |
| 6,176,446 B1 | * | 1/2001 | Sato | ............................ | 242/319 |
| 6,382,541 B1 | * | 5/2002 | Liu | ............................ | 242/241 |
| 6,533,201 B1 | * | 3/2003 | Miyazaki et al. | ............ | 242/295 |
| 6,626,385 B1 | * | 9/2003 | Tsutsumi | ..................... | 242/282 |

FOREIGN PATENT DOCUMENTS

FR 2393530 A1 1/1979

* cited by examiner

*Primary Examiner*—Emmanuel Marcelo
(74) *Attorney, Agent, or Firm*—Shinjyu Global IP Counselors, LLP (57) ABSTRACT

A master gear shaft of a spinning reel has a through-hole having a rectangular cross-section formed on the inner periphery of the master gear shaft. A handle shaft has a head that interlocks with the right end of the master gear shaft, a trunk which extends from the head and is non-rotatively inserted into the through-hole, and a first threaded portion having a male screw projecting from the tip of the trunk. A handle arm has a boss for interlocking with the left end of the master gear shaft, a second threaded portion, which is a female screw threaded portion that engages with the first threaded portion and is provided on the boss, and an arm that extends from the boss in a direction interlocking with the master gear shaft. The handle assembly prevents a handle shaft from loosening from a master gear shaft in a spinning reel.

23 Claims, 9 Drawing Sheets

SPINNING REEL HANDLE ASSEMBLY

BACKGROUND OF THE INVENTION

1. Field of the Invention

This invention generally relates to a handle assembly. More specifically, the present invention relates to spinning reel handle assembly detachably mounted to a spinning reel master gear shaft in which a non-circular through-hole is formed.

2. Background Information

Generally, a spinning reel has a reel unit and a handle assembly rotatively mounted to the reel unit. A master gear shaft is rotatively mounted to the reel unit, and a handle assembly is non-rotatively mounted to the master gear shaft. The master gear shaft is a tubular member in which a through-hole is formed in a rectangular, hexagonal or other non-circular shape. The handle assembly is provided with a handle shaft having an outer shape that non-rotatively interlocks with the master gear shaft through-hole. The handle assembly is fixedly coupled to the master gear shaft by screw-joining the handle shaft with a tool or the like from the side opposite the mounting side.

With the conventional handle assembly, the handle shaft is coupled by screw-joining it with a piece of hardware or the like. In such cases, because the tightening torque of the hardware upon the handle shaft cannot be made large, the handle shaft may become loose from the master gear shaft. If the handle shaft becomes loose from the master gear shaft, the handle assembly may not rotate properly.

One conceivable approach to solving this problem is to employ a screw-in type handle assembly that will reduce loosening as it is used. However, when a screw-in type handle assembly is used, the master gear shaft must be replaced with one especially designed for such screwing-in. Because a user will be unable to perform this kind of master gear shaft replacement by himself, it is difficult to prevent the handle shaft from becoming loose from the master gear shaft.

In view of the above, there exists a need for a spinning reel handle assembly which overcomes the above mentioned problems in the prior art. This invention addresses this need in the prior art as well as other needs, which will become apparent to those skilled in the art from this disclosure.

SUMMARY OF THE INVENTION

It is a purpose of the present invention to provide a spinning reel handle assembly in which the loosening of the handle shaft from the master gear shaft can be easily prevented.

The spinning reel handle assembly according to a first aspect of the present invention is a spinning reel handle assembly detachably mounted to a spinning reel master gear shaft in which a non-circular through-hole is formed. The spinning reel handle assembly has a handle shaft unit, a handle arm unit, and a handle grip. The handle shaft unit has a head portion that interlocks with either end of the master gear shaft, a trunk portion that extends from the head and can be non-rotatively inserted into the through-hole, and a first threaded portion formed on the tip of the trunk portion. The handle arm unit has a boss portion, a second threaded portion, and an armed part. The boss portion interlocks with either end of the master gear shaft. The second threaded portion is formed in the boss portion and engages with the first threaded portion. The arm part extends from the boss portion in a direction intersecting with the master gear shaft. The handle grip is fitted on the tip of the handle arm unit.

In this handle assembly, the second threaded portion of the handle arm unit engages in the first threaded portion of the handle shaft unit through the rotation of the handle arm unit, thereby fixing the handle shaft unit to the master gear shaft without using hardware. Therefore, the tightening torque on the handle shaft from the handle arm rotation can be made greater than the torque in the case of screw-joining with a piece of hardware. Accordingly, the loosening of the handle shaft from the master gear part can be easily prevented, without having to use a screw-in type handle assembly.

In addition, if, for example, the handle assembly is configured so that the first and second threaded portions are screwed together more tightly, the more the handle arm is rotated, the more the handle assembly is used, the more the loosening will be reduced. Therefore, the loosening of the handle shaft from the master gear shaft can be prevented even more easily.

The handle assembly according to a second aspect of the present invention is the handle assembly according to the first aspect, in which the first threaded portion is a male screw protruding from the tip of the trunk portion, and the second threaded portion is female screw threads that open on the boss portion.

The handle assembly according to a third aspect of the present invention is the handle assembly according to the first aspect, in which the first threaded portion is female screw threads opening on the tip of the trunk portion, and the second threaded portion is a male screw protruding from the boss portion.

The handle assembly according to a fourth aspect of the present invention is the handle assembly according to any of the first through third aspects, in which the arm part extends in one direction from the boss portion. With this aspect, the present invention can be used in cases of a single handle, where one handle grip is provided on the arm part.

The handle assembly according to a fifth aspect of the present invention is the handle assembly according to any of the first through third aspects, in which the arm part can extend in two opposing directions from the boss. In this case, the present invention can be used as double handles, where two handle grips are provided on the arm part.

The handle assembly according to a sixth aspect of the present invention is the handle assembly according to any of the first through fifth aspects, in which the non-circular through hole of the master gear is substantially polygonal, and the trunk portion has a cross-sectional shape that can be unrotatively coupled to the substantially polygonal through-hole of the master gear. With this aspect, by forming the through-hole to have, for example, a rectangular, hexagonal or otherwise substantially polygonal shape, the locking of the handle shaft in the master gear shaft can be carried out easily.

The handle assembly according to a seventh aspect of the present invention is the handle assembly according to any of the first through sixth aspects, further including a cushioning member to be disposed between the boss portion and the master gear shaft.

The handle assembly according to a eighth aspect of the present invention is the handle assembly according to any of the first through seventh aspects, in which a cushioning member is further provided, disposed between the boss portion and an end surface of the head portion. With this aspect, by providing a cushioning member made, for example, from synthetic resin, between the boss and master gear shaft end surface, the first and second threaded portions can be prevented from overscrewing. Because any play in the axial direction is absorbed, slackness in the axial direction can be suppressed.

The handle assembly according to a ninth aspect of the present invention is the handle assembly according to any of the first through eighth aspects, in which the master gear shaft has a plurality of protuberances for locking, projecting from both end surfaces in the outer axial directions. The head has a plurality of contact parts that come in contact with both end surfaces of the master gear shaft, and a plurality of non-contact parts that is formed in the spaces between the plurality of contact parts and cut out so as not to come in contact with the plurality of protuberances. With this aspect, with a conventional non-circular engagement-type handle assembly in which a handle shaft is screw-fixed, a plurality of protuberances for locking a fixing screw are formed on both end surfaces of a master gear shaft. When a handle shaft according to the present invention is mounted to a handle assembly having this kind of master gear shaft, because a plurality of non-contact parts are formed on the head, the plurality of protuberances can be prevented from coming into contact with the non-contact parts. In addition, when mounting such a handle shaft, there is no need to mount, for example, a washer made of synthetic resin to prevent the plurality of protuberances from coming in contact with the head, which leads to a reduction in costs.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

First Embodiment

Figure 1:
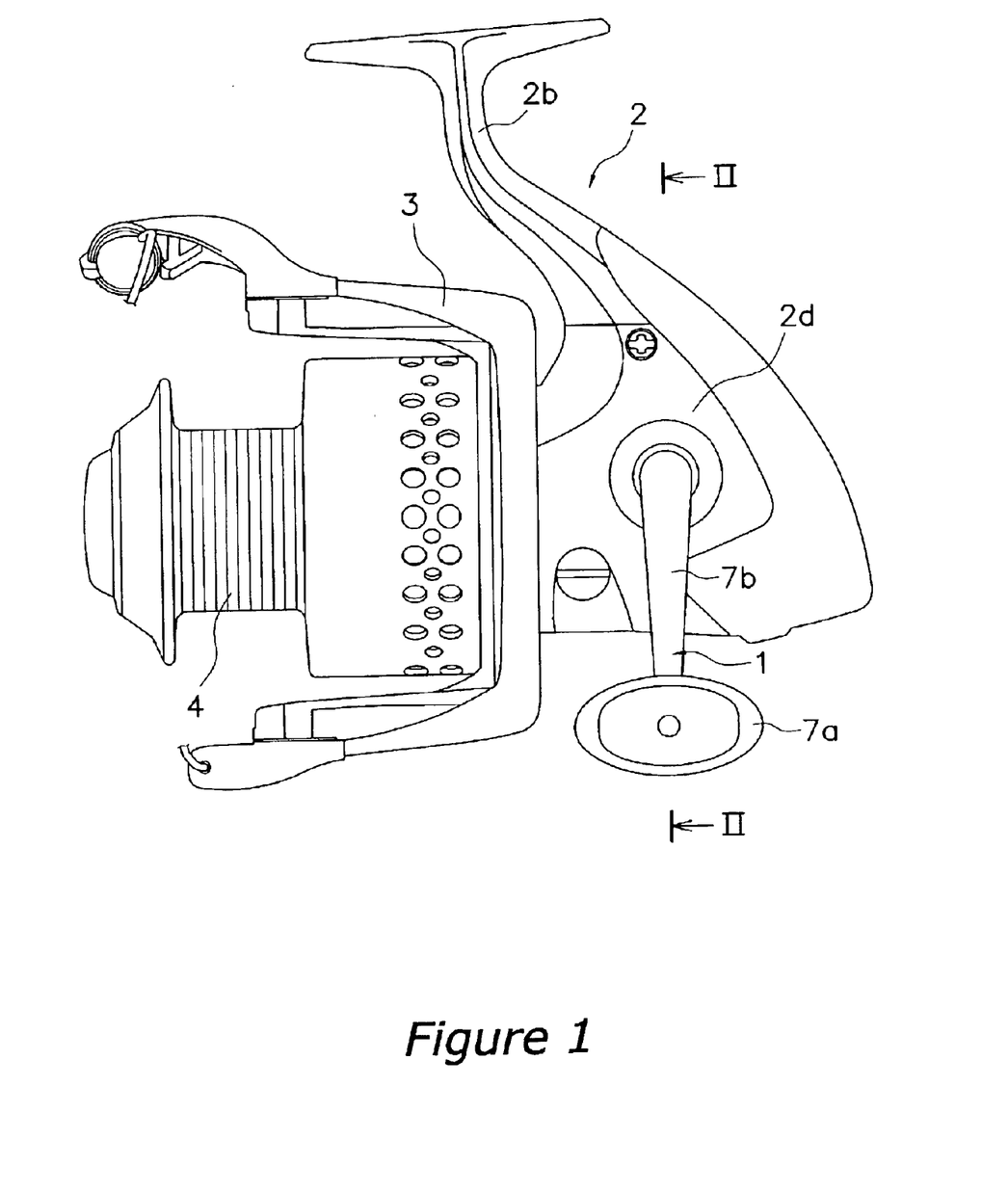
FIG. 1 is a left side view of a spinning reel according to a first embodiment of the present invention.

As shown in FIG. 1, a spinning reel in which a first embodiment of the present invention has been employed is a reel that winds a fishing line around an axis that is parallel to an axis of the fishing pole. The spinning reel includes a reel unit 2 that has a handle assembly 1, a rotor 3, and a spool 4. The rotor 3, which is rotatively supported at the front part of the reel unit 2, winds fishing line around the spool 4. Fishing line is wound around the outer peripheral surface of the spool 4, which is disposed on the front part of the rotor 3 and which can be moved back and forth.

As shown in FIGS. 1 to 4, the reel unit 2 has a reel body 2a that has an opening 2c on the left side, a T-shaped rod attachment leg 2b extending diagonally upward to the front from the reel body 2a and formed unitarily therewith, and a lid 2d that covers the opening 2c. The reel body 2a has a space inside. Provided within that space is a rotor drive mechanism 5 that transmits the rotation of the handle assembly 1 to rotate the rotor 3 and an oscillation mechanism 6 for pumping the spool 4 back and forth to wind fishing line onto it uniformly.

Figure 4:
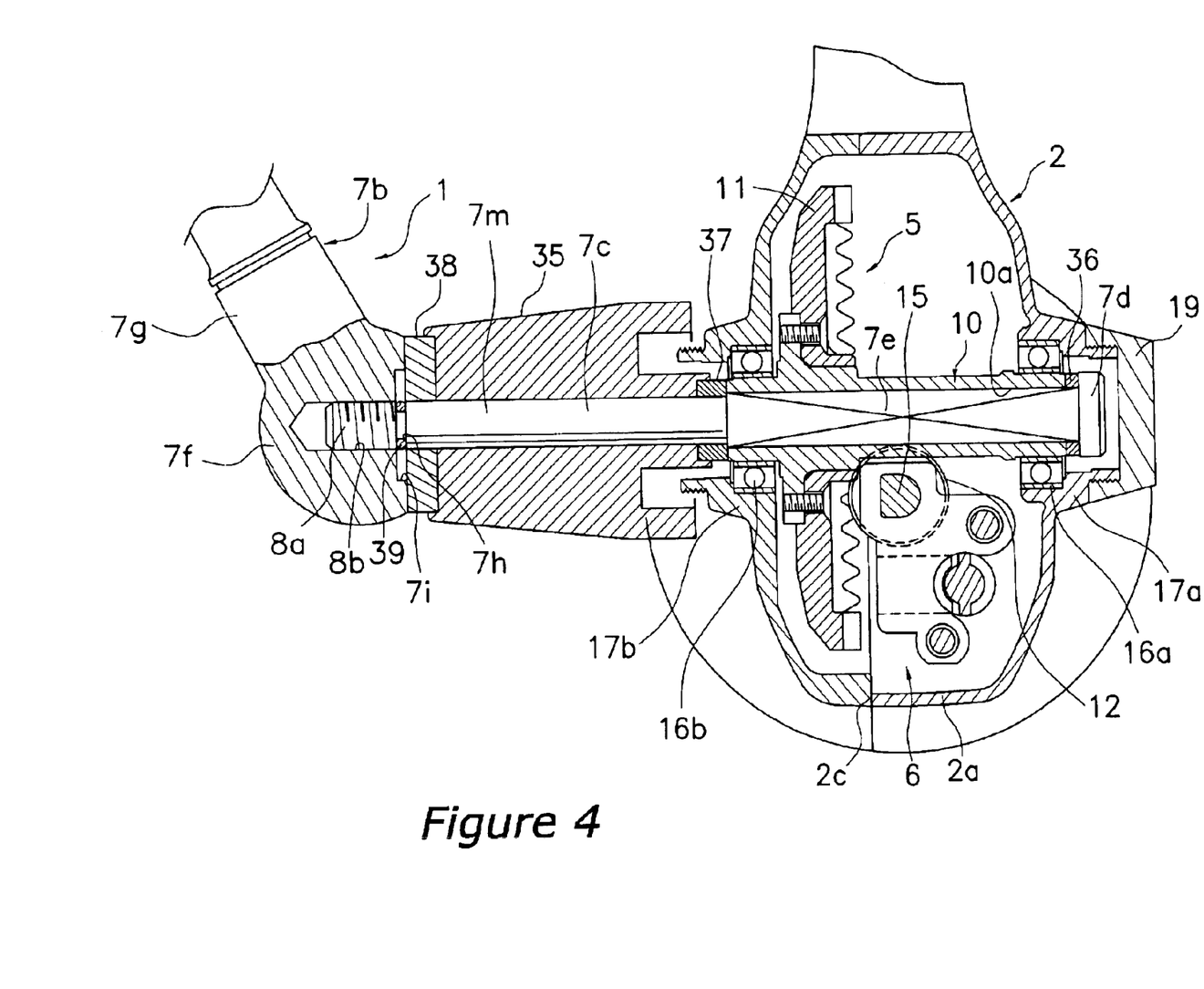
FIG. 4 is an expanded cross-sectional view of the handle shaft area of the spinning reel according to the first embodiment of the present invention.

As shown in FIG. 4, a tubular boss 17a is formed on the reel body 2a. The boss 17a is formed protruding outward from the reel body 2a, so as to accommodate a bearing 16a supporting the right end (as shown in FIG. 4) of the master gear shaft 10. A boss 17b is also formed in the lid 2d, opposite the boss 17a. The boss 17b is formed protruding outward from the reel body 2a, to accommodate a bearing 16b that supports the left end (as shown in FIG. 4) of the master gear shaft 10. The boss 17a, which is disposed away from the side where the handle assembly 1 is mounted, is covered by a cap member 19.

Figure 3:
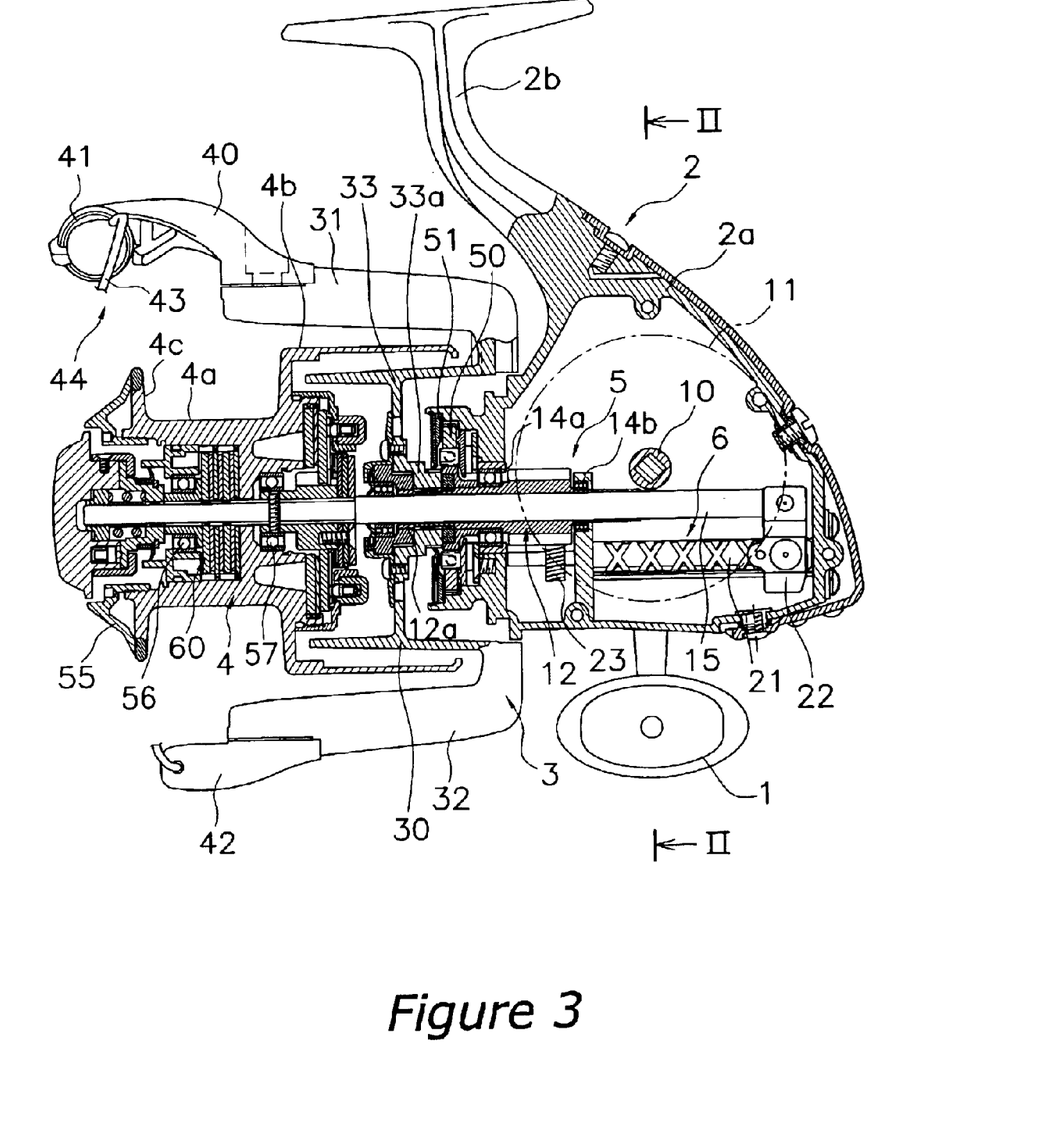
FIG. 3 is a Lateral cross-section view of the left side of the spinning reel according to the first embodiment of the present invention.

Referring to FIG. 3, the rotor 3 includes a cylindrical portion 30, and a first rotor arm 31 and second rotor arm 32 which are disposed opposing each other laterally on the cylindrical portion 30. The cylindrical part 30 and the first rotor arm 31 and second rotor arm 32 are made, for example, from an aluminum alloy, and are formed unitarily. A front wall 33 is formed on the front of the cylindrical part 30, and a boss 33a is formed in the center portion of the front wall 33. A through-hole, in which a pinion gear 12 non-rotatively interlocks, is formed in the central portion of the boss 33a. A front part 12a of the pinion gear 12 and a spool shaft 15 pass through this through-hole.

The first rotor arm 31 extends outward from the cylindrical part 30 and then bends and extends towards the front. The section that connects with the 30 expands and curves along the circumferential direction of the cylindrical part 30. A first bail support member 40 is pivotably mounted to the outer periphery of the tip of the first rotor arm 31. A line roller 41 for guiding fishing line around the spool 4 is mounted to the tip of the first bail support member 40.

The second rotor arm 32 extends outward from the cylindrical part 30 and then bends and extends towards the front. A second bail support member 42 is pivotably mounted to the outer periphery of the tip of the second rotor arm 32.

A bail 43 made from wire bent into a substantially U-shape is fixedly coupled between the line roller 41 and the second bail support member 42. The first bail support member 40, second bail support member 42, line roller 41 and bail 43 constitute a bail arm 44 that guides fishing line around the spool 4. The bail arm 44 can pivot between a line-guiding position shown in FIG. 3 and the opposite line-releasing position.

An anti-reversing mechanism 50 for preventing reverse rotation of the rotor 3 is provided within the cylindrical portion 30 of the rotor 3. The anti-reversing mechanism 50 has a one-way clutch 51 with an inner ring that freely rotates. Since one-way clutch is well known in the art, detailed explanation of the one-way clutch 51 is omitted herein.

The spool 4 is disposed between the first rotor arm 31 and second rotor arm 32 of the rotor 3. The spool 4 is mounted to the tip of the spool shaft 15 with a drag mechanism 60 interposed therebetween. Since drag mechanism is well known in the art, detailed explanation of the drag mechanism 60 is omitted herein. The spool 4 includes a bobbin trunk 4a onto which fishing line is circumferentially wound, a skirt 4b formed unitarily with the rear portion of the bobbin trunk 4a, and a flange plate 4c fixedly attached to the front end of the bobbin trunk 4a. The bobbin trunk 4a is a straight, cylindrical member. The circumferential surface of the bobbin trunk 4a is configured to be parallel with the spool shaft 15. The bobbin trunk 4a is rotatively mounted to the spool shaft 15 by two bearings 56, 57.

Figure 2:
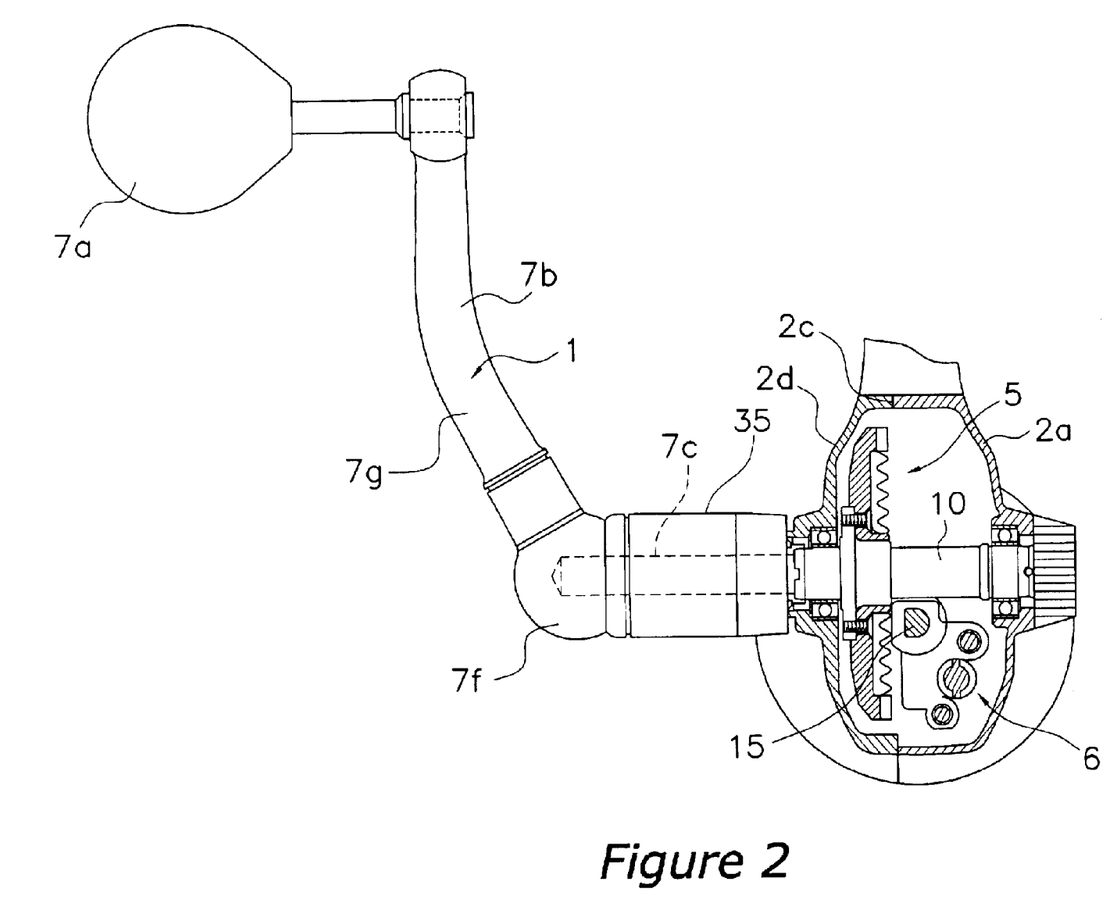
FIG. 2 is a cross-sectional view of the spinning reel according to the first embodiment of the present invention as viewed along II—II in FIG. 1.

As shown in FIGS. 2 and 3, the rotor driving mechanism 5 includes a master gear shaft 10 on which the handle assembly 1 is non-rotatively mounted, a master gear 11 that is a face gear that rotates with the master gear shaft 10, and a pinion gear 12 that meshes with the master gear 11. Both ends of the master gear shaft 10 are rotatively supported on the reel body 2a by bearings 16a and 16b.

As shown in FIG. 3, the pinion gear 12 is fitted to the reel unit 2 so as to be rotatable along the axial direction of the fishing pole. The front section 12a of the pinion gear 12 passes through the center of the rotor 3 and is fastened to the rotor 3 with a nut 13. The pinion gear 12 is rotatively supported on the reel unit 2 along the axial direction by bearings 14a and 14b at the center and rear, respectively. The spool shaft 15 passes through the inside of this pinion gear 12. The pinion gear 12 meshes with both the master gear 11 and the oscillation mechanism 6.

The oscillation mechanism 6 is a mechanism for pumping the spool 4 back and forth by pumping back and forth the spool shaft 15, which is linked to the central portion of the spool 4 with the drag mechanism 60 interposed therebetween. The oscillation mechanism 6 includes a worm 21 disposed substantially directly below and parallel to the spool shaft 15, a slider 22 that moves back and forth parallel to the worm 21, and a speed-lowering mechanism 23 that lowers the speed of and transmits the rotation of the pinion gear 12 to the worm 21. The rear end of the spool shaft 15 is non-rotatively fixed to the slider 22.

As shown in FIGS. 2 and 4, the handle assembly 1 engages with the master gear shaft 10 on which the master gear 11 is disposed. The handle assembly 1 is of a left-handle type to be mounted on the left side of the reel unit 2. The handle assembly 1 winds up fishing line when turned counterclockwise (as seen from the left side). The handle assembly 1 includes a substantially T-shaped handle grip 7a, a substantially L-shaped handle arm 7b on the tip of which the handle grip 7a is rotatively mounted, and a handle shaft 7c pivotably mounted to the base of the handle arm 7b.

As shown in FIG. 4, the master gear shaft 10 is rotatively supported on the reel unit 2 and has a through-hole 10a with a substantially rectangular cross-section formed on its inner periphery. The handle shaft 7c can pass through the through-hole 10a.

Figure 5:
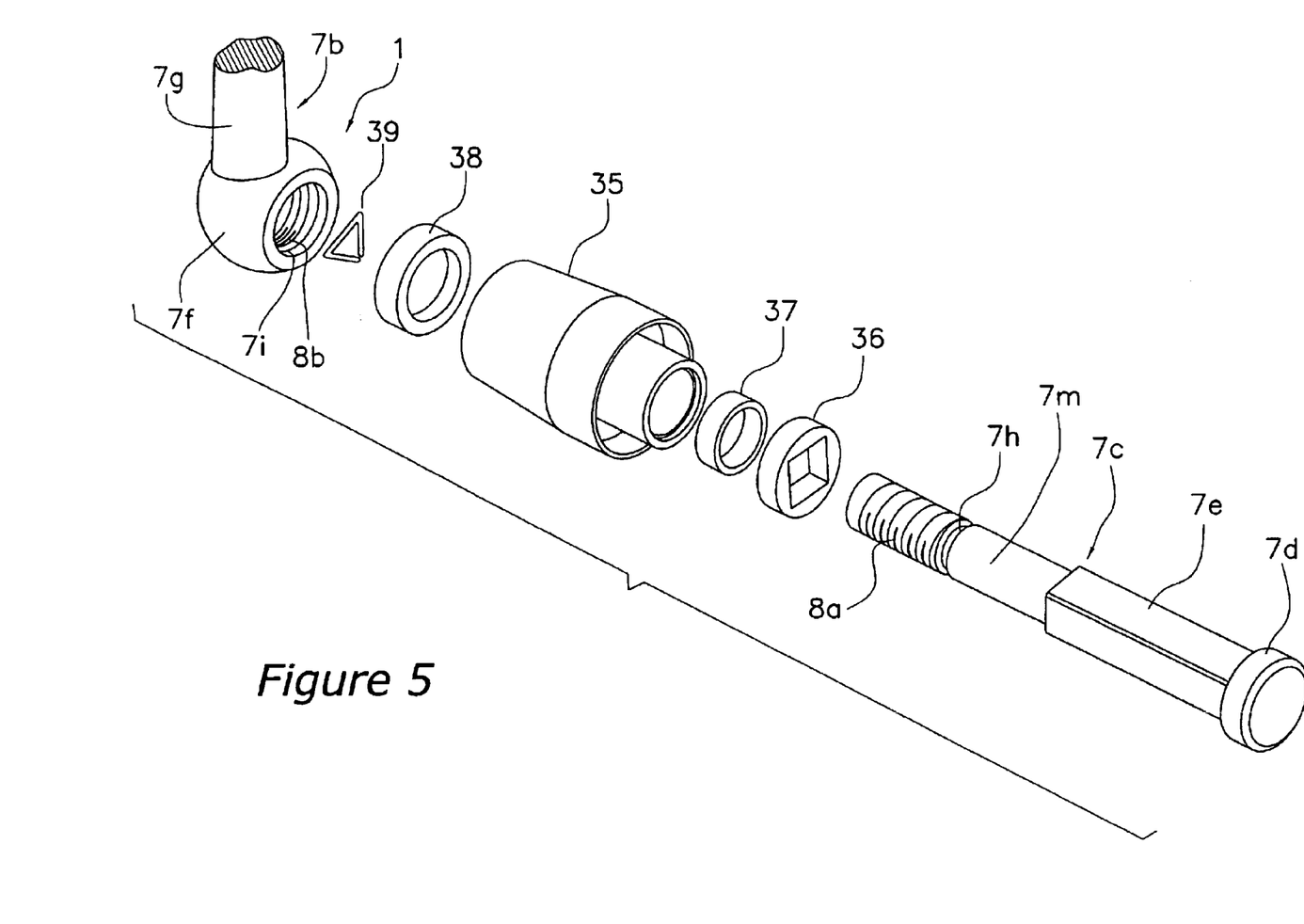
FIG. 5 is an exploded perspective view of the handle shaft area of the spinning reel according to the first embodiment of the present invention.

As shown in FIGS. 4 and 5, the handle shaft 7c has a head 7d that interlocks with the right end of the master gear shaft 10, a trunk 7e that extends from the head 7d and is non-rotatively inserted into the through-hole 10a, a cylindrical portion 7m extending from said trunk 7e, and a first threaded portion 8a constituted by a male screw formed to protrude from the tip of the trunk 7e. The trunk 7e which is inserted into the through-hole 10a has a substantially rectangular cross-section. A collar member 35 is fitted to the outer periphery of the cylindrical portion 7m, and the right end of the collar member 35 is coupled to the left end of the master gear shaft 10 with a cushioning member 37 disposed therebetween. The cushioning member 37 is a cylindrical member made from synthetic resin that engages with the right end of the collar member 35 and is disposed between the right end of the collar member 35 and the left end of the master gear shaft 10. An annular cushioning member 36 made from synthetic resin, through which the trunk 7e passes, is fitted on the handle shaft 7c, and disposed between the head 7d and the right end of the master gear shaft 10. An annular member 38, formed by an annular washer with a diameter smaller than that of the collar member 35, is fitted on the left end of the collar member 35. A groove 7h is formed on the outer periphery of the base of the first threaded portion 8a on the tip of the cylindrical portion 7m, which extends from the trunk 7e. A substantially triangular metal wire spring member 39 interlocks with this groove 7h, thereby preventing the collar member 35 and the annular member 38 from separating from the handle shaft 7c. In addition, the synthetic resin cushioning members 36 and 37 prevent the first threaded portion 8a and second threaded portion 8b from overscrewing. Since the first and second threaded portions 8a and 8b absorb play in the axial direction, they help prevent slack.

As shown in FIGS. 4 and 5, the handle arm 7b includes a second threaded portion 8b, a boss 7f, and an arm part 7g. The second threaded portion 8b is a female threads that engages with the first threaded portion 8a of the handle shaft 7c. The second threaded portion 8b is provided in the boss 7f, which couples with the left end (as shown in FIG. 4) of the master gear shaft 10 with the collar member 35 and the annular member 38 disposed therebetween. The arm part 7g extends from the boss 7f in a direction orthogonal to the master gear shaft 10. The arm part 7g extends from the boss 7f in one direction. The handle grip 7a (see FIG. 2) is fitted to the tip of the arm part 7g. A recess 7i which is capable of accommodating the spring member 39 is formed on the right end section of the boss 7f. The spring member 39 is fitted on the groove 7h of the handle shaft 7c.

As shown in FIGS. 4 and 5, in order to attach such a handle arm 7b and handle shaft 7c to the master gear shaft 10, first, the trunk 7e of the handle shaft 7c is passed through the cushioning member 36. In this state, the cap member 19 is removed from the boss 17a, and from there the handle shaft 7c is inserted into the master gear shaft 10. Next, the collar member 35, into the right end of which the cushioning member 36 is inserted, and the annular member 38 are fitted in this order. Then, the spring member 39 is caught on the groove 7h of the handle shaft 7c, and the collar member 35 and the annular member 38 are attached to the handle shaft 7c. Finally, rotation of the handle arm 7b causes the first threaded portion 8a formed on the tip of the handle shaft 7c to screw into the second threaded portion 8b formed in the boss 7f of the handle arm 7b, thus causing the handle shaft 7c to be attached to the master gear shaft 10. When the handle arm 7b is rotated in a state where the rotation of the rotor 3 is not possible, the first threaded portion 8a and the second threaded portion 8b are tightly screwed together.

With such a handle assembly 1, rotation of the handle arm 7b causes the first threaded portion 8a of the handle shaft 7c to screw into the second threaded portion 8b of the handle arm 7b, so that the handle shaft 7c is fixed to the master gear shaft 10 without additional hardware. Because greater tightening torque can be applied to the handle shaft 7c by the rotation of the handle arm 7b than in the case of screw-joining with hardware, the loosening between the handle shaft 7c and the master gear shaft 10 can be easily prevented, without having to use a screw-in type handle assembly.

Second Embodied Embodiment

Figure 6:
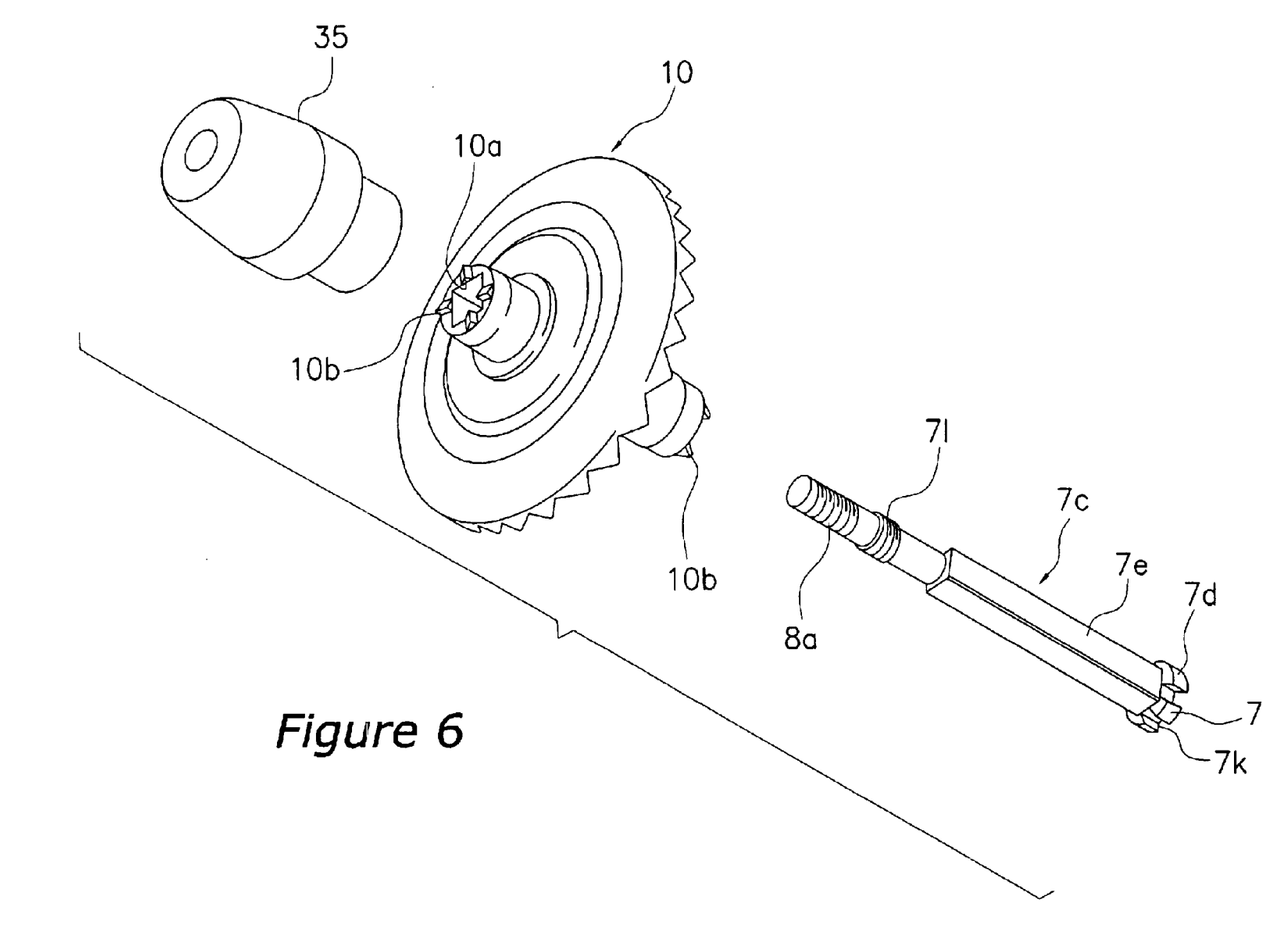
FIG. 6 is an expanded cross-sectional view of the handle shaft area of the spinning reel according to a second embodiment of the present invention, which corresponds to FIG. 4.
Figure 7:
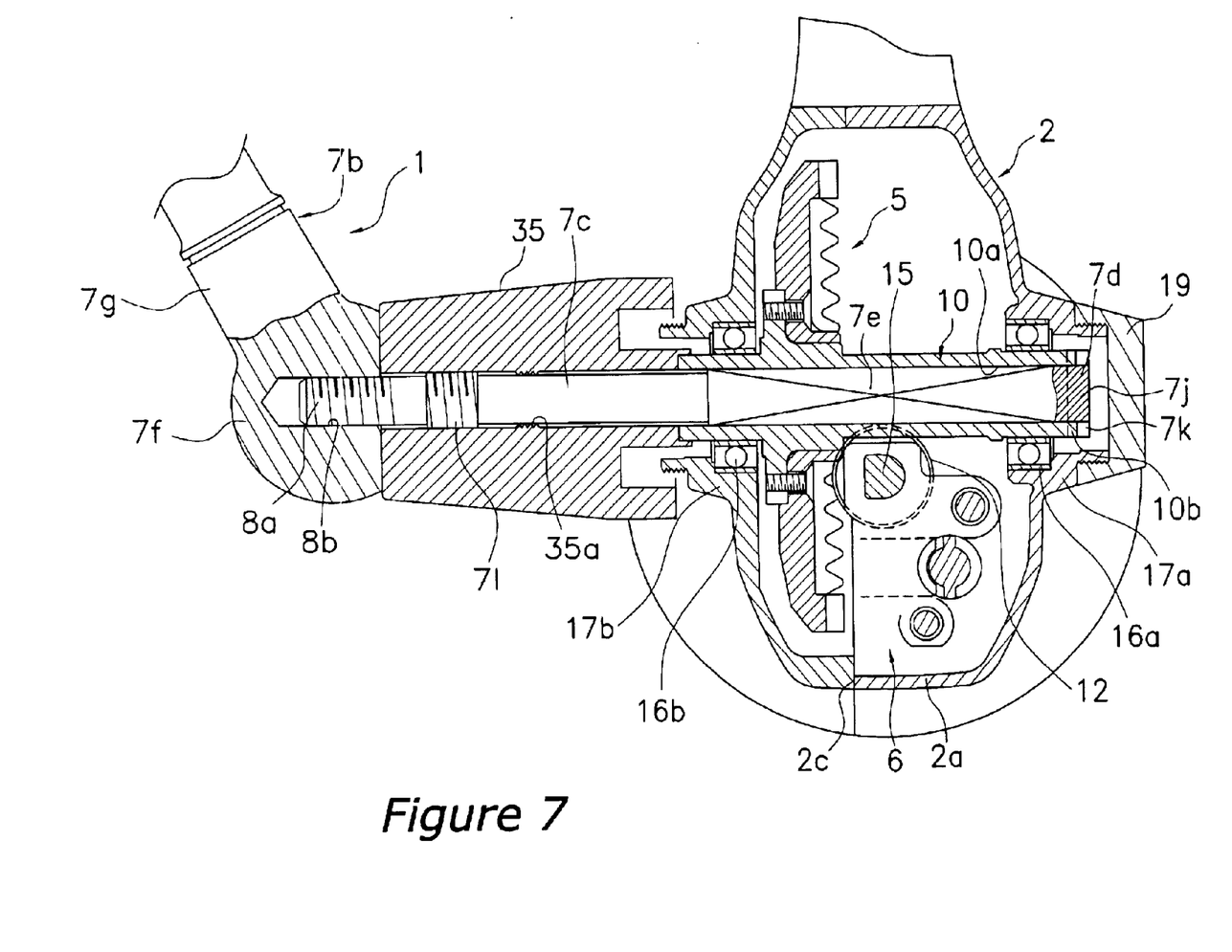
FIG. 7 is an exploded perspective view of the handle shaft area of the spinning reel according to the second embodiment of the present invention, which corresponds to FIG. 5.

Referring now to FIGS. 6–7, a handle assembly in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The spinning reel according to a second embodiment of the present invention has, with the exception of the master gear shaft 10 and the handle shaft 7c, the same configuration as the first embodiment. Accordingly, a detailed discussion of such configuration will be omitted.

As shown in FIGS. 6 and 7, formed on the inner periphery of the master gear shaft 10 is a through-hole 10a with a substantially rectangular cross-section. The handle shaft 7c can pass through this through-hole 10a. The master gear shaft 10 has a plurality of protuberances 10b for locking, which are projecting outward in the axial direction from both end surfaces thereof. The protuberances 10b are formed in the shape of projecting peaks, and are formed at a total of eight locations, i.e., four evenly spaced locations around the circumference at both ends of the through-hole 10a. In a non-circular engagement-type handle assembly, in which a handle shaft is fixedly coupled by screwing, the protuberances 10b are formed so as to come in contact with, for example, a synthetic resin washer or the like and lock a fixing screw.

As shown in FIGS. 6 and 7, the handle shaft 7c has a head 7d that interlocks with the right end of the master gear shaft 10, a trunk 7e the base of which lines up with the head 7d and which is non-rotatively inserted into the through-hole 10a, and a first threaded portion 8a that is a male screw formed to project from the tip of the trunk 7e. The section of the trunk 7e that is to be inserted into the through-hole 10a has a substantially rectangular cross-sectional form. The head 7d has four contact parts 7j that come in contact with both end surfaces of the master gear shaft 10 and four non-contact parts 7k formed in the spaces between the four contact parts 7j and cut out so as not to come in contact with the protuberances 10b.

When the handle shaft 7c is fitted onto the master gear shaft 10, because there are non-contact parts 7k formed on the head 7d, contact with the protuberances 10b is averted. Thus, there is no need to provide a synthetic resin washer or the like for the purpose of preventing the protuberances 10b from making contact with the head 7d. Accordingly, production costs can be reduced.

Because the non-contact parts 7k are formed on the head 7d, there is no need for the cushioning member 36 provided in the first embodiment. In addition, there is no need for the cushioning member 37 fitted on the collar member 35 of the first embodiment either, because of the aforementioned contact parts 7j and non-contact parts 7k.

In addition, as shown in FIGS. 6 and 7, between the first threaded portion 8a and the trunk 7e of the handle shaft 7c, a male threaded portion 7l is formed. The male threaded portion 7l has a diameter larger than that of the first threaded portion 8a and smaller than that of the trunk 7e. This male threaded portion 7l prevents the collar member 35 from slipping off, by engaging with and passing through the female threads 35a (see FIG. 7) formed on the inner periphery of the collar member 35. Therefore, in this second embodiment, the groove 7h on the handle shaft 7c and the spring member 39 are unnecessary.

In a handle assembly 1 thus configured, as with the first embodiment, the handle shaft 7c is fixedly coupled to the master gear shaft 10 without the use of a tool, because the second threaded portion 8b of the handle arm 7b engages with the first threaded portion 8a of the handle shaft 7c through the rotation of the handle arm 7b. Because greater tightening torque can be applied to the handle shaft 7c through the rotation of the handle arm 7b compared to the case in which screw-joining is achieved with the use of a hardware, the loosening of the handle shaft 7c from the master gear shaft 10 can be easily prevented, without having to use a screw-in type handle assembly.

Other Embodiments (a) In the above embodiments, descriptions were given of a spinning reel having a front drag mechanism. The present invention can also be applied to other types of spinning reels, such as lever-drag types and closed-face types.

Figure 8:
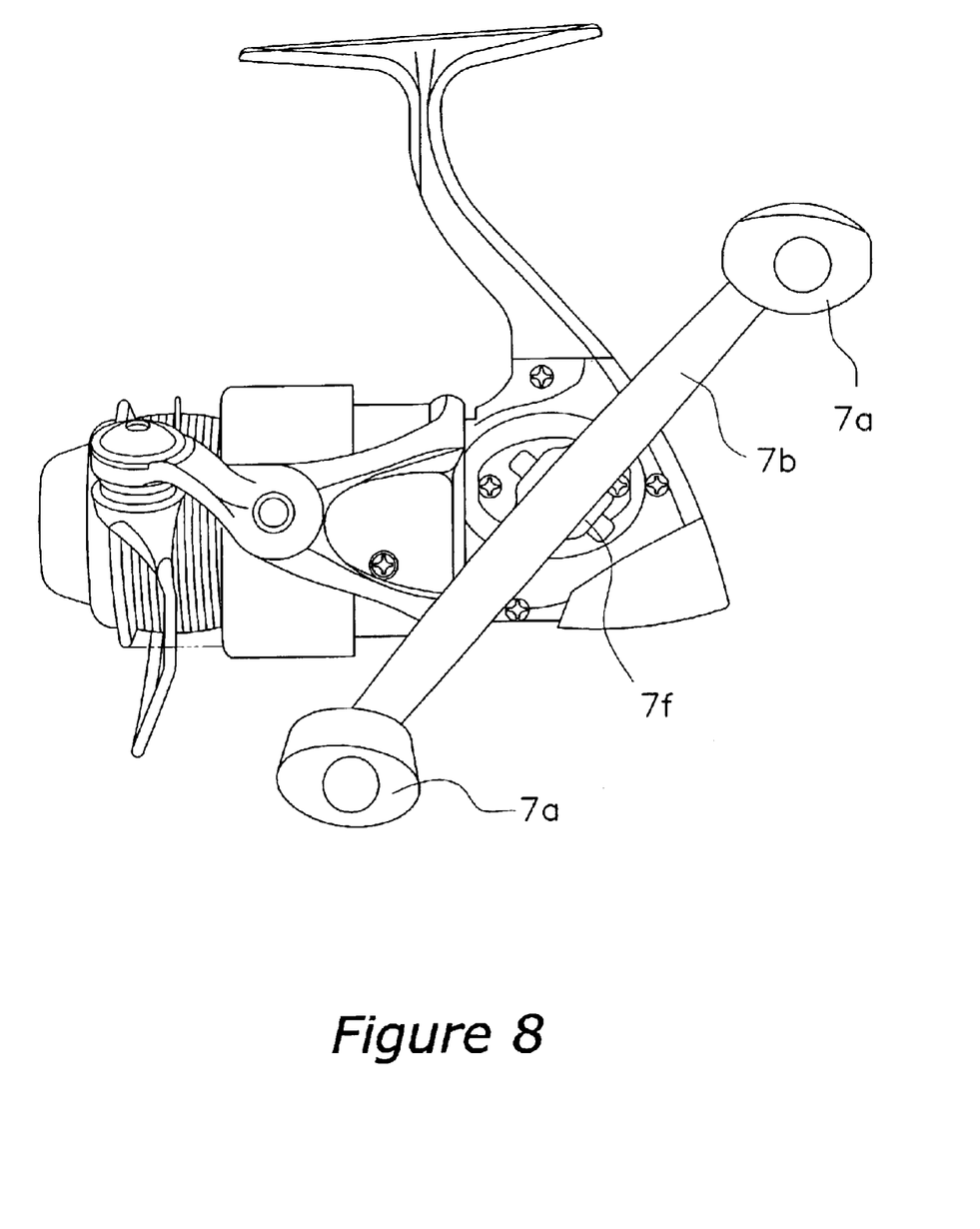
FIG. 8 is a left side view of the spinning reel according to still another embodiment of the present invention.

(b) In the above embodiments, the arm 7g is a single handle that extends from the boss 7f in one direction. However, as seen in FIG. 8, an arm 7g may be provided such that it extends from the boss 7f in two opposing directions, to form a double handle on both ends of which a handle grip 7a is provided.

(c) In the above embodiments, the cross-sections of the through-hole 10a and the trunk 7e are substantially rectangular. However, the shape is not limited to rectangular, and may be polygonal, as in a hexagon, or other such non-circular shape.

Figure 9:
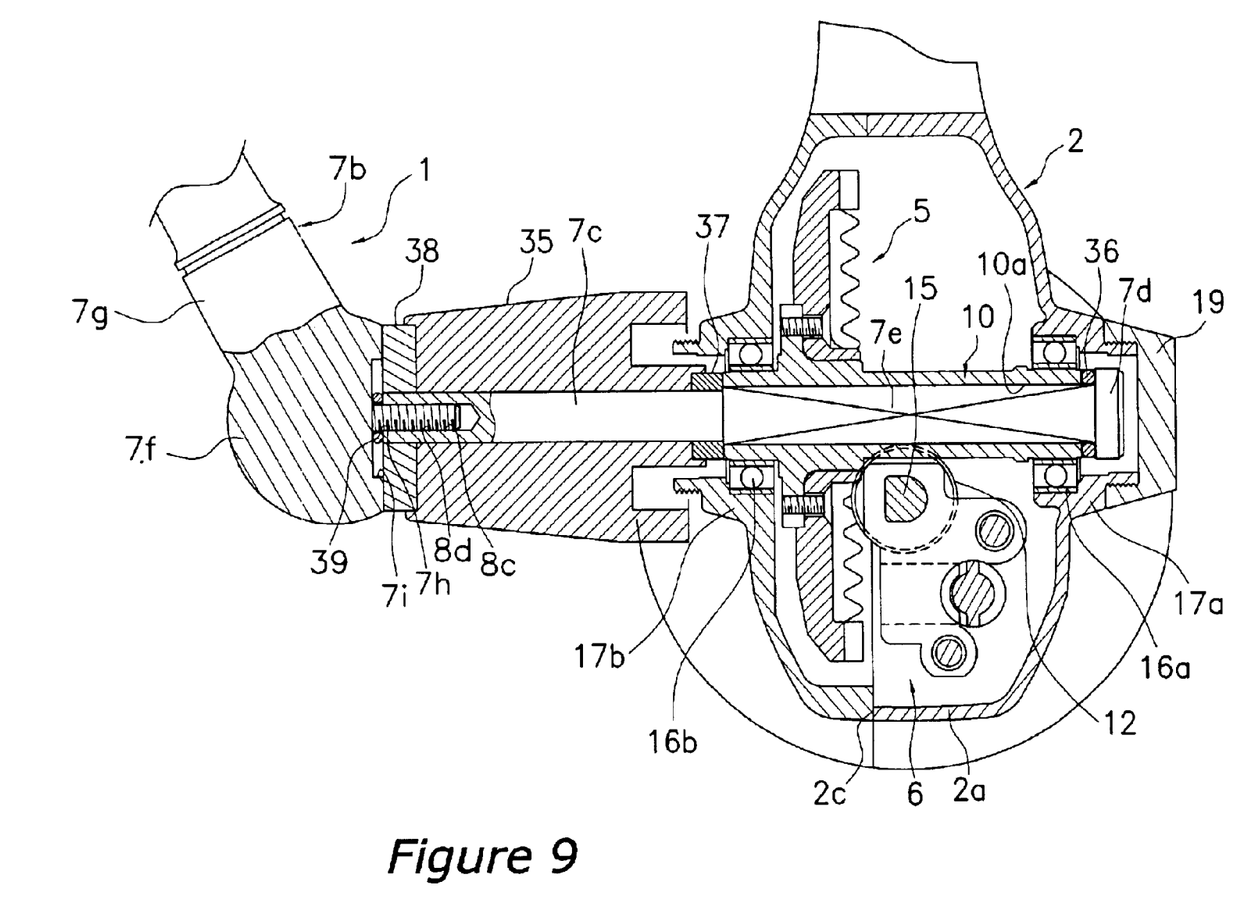
FIG. 9 is an expanded cross-sectional view of the handle shaft area of the spinning reel according to still another embodiment of the present invention, which corresponds to FIG. 4.

(d) As shown in FIG. 9, a configuration is possible such that the first threaded portion 8c is female screw threads that open on the tip of the handle shaft 7c, and the second threaded portion 8d is a male screw projecting from the boss 7f. In such a case, as with the above embodiments, the loosening of the handle shaft 7c from the master gear shaft 10 is easily prevented.

In accordance with the present invention, in a handle assembly for a fishing reel, the loosening of the handle shaft from the master gear shaft can be easily prevented by having a first threaded portion of the handle shaft engage with a second screw shaft on the handle arm.

As used herein, the following directional terms "forward," "rearward," "above," "downward," "vertical," "horizontal," "below" and "transverse" as well as any other similar directional terms refer to those directions of a device equipped with the present invention. Accordingly, these terms, as utilized to describe the present invention should be interpreted relative to a device equipped with the present invention.

The terms of degree such as "substantially," "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Applications Nos. 2002-130062 and 2002-308463. The entire disclosure of Japanese Patent Applications Nos. 2002-130062 and 2002-308463 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A spinning reel handle assembly to be detachably mounted to a spinning reel master gear shaft in which a non-circular through hole is formed, the spinning reel handle assembly comprising:

a handle shaft unit having
a head portion for interlocking with either end of the master gear shaft,
a trunk portion extending from said head portion, such that said trunk portion is non-circular and adapted to be non-rotatively inserted into the non-circular through-hole of the master gear shaft, and
a first threaded portion formed on a tip of said trunk portion;

a handle arm unit having
a boss portion for interlocking with either end of the master gear shaft,
a second threaded portion formed in said boss portion for engaging with said first threaded portion, and
an arm part extending from said boss portion in a direction intersecting the master gear shaft; and a handle grip fitted on a tip of said handle arm unit.

2. A spinning reel handle assembly according to claim 1, wherein
said first threaded portion is a male screw projecting from the tip of said trunk portion, and
said second threaded portion is female screw threads formed in said boss portion.

3. A spinning reel handle assembly according claim 1, wherein said arm part extends in one direction from said boss portion.

4. A spinning reel handle assembly according to claim 1, wherein said arm part extends in two opposing directions from said boss portion.

5. A spinning reel handle assembly according to claim 1, wherein
the non-circular through hole of the master gear is substantially polygonal, and
said trunk portion has a cross-sectional shape that is adapted to be unrotatively coupled to the substantially polygonal through-hole of the master gear.

6. A spinning reel handle assembly according to claim 1, further comprising
a cushioning member to be disposed between said boss portion and the master gear shaft.

7. A spinning reel handle assembly according to claim 1, wherein said hand shaft unit further includes
a collar member to be coupled between said boss portion and the master gear shaft.

8. A spinning reel handle assembly according to claim 7, further comprising
a cushioning member to be disposed between said collar member and the master gear shaft.

9. A spinning reel handle assembly to be detachably mounted to a spinning reel master gear shaft in which a non-circular through hole is formed, the spinning reel handle assembly comprising:

a handle shaft unit having
a head portion for interlocking with either end of the master gear shaft,
a trunk portion extending from said head portion, such that said trunk portion is adapted to be non-rotatively inserted into the non-circular through-hole of the master gear shaft, and
a first threaded portion formed on a tip of said trunk portion;

a handle aim unit having
a boss portion for interlocking with either end of the master gear shaft,
a second threaded portion formed in said boss portion for engaging with said first threaded portion, and
an arm part extending from said boss portion in a direction intersecting the master gear shaft; and a handle grip fitted on a tip of said handle arm unit, wherein
said first threaded portion is female screw threads that open on the tip of said trunk portion, and
said second threaded portion is a male screw that protrudes from said boss portion.

10. A spinning reel handle assembly to be detachably mounted to a spinning reel master gear shaft in which a non-circular through hole is formed, the spinning reel handle assembly comprising:

a handle shaft unit having
a head portion for interlocking with either end of the master gear shaft,
a trunk portion extending from said head portion, such that said trunk portion is adapted to be non-rotatively inserted into the non-circular through-hole of the master gear shaft, and
a first threaded portion formed on a tip of said trunk portion;

a handle arm unit having
a boss portion for interlocking with either end of the master gear shaft,
a second threaded portion formed in said boss portion for engaging with said first threaded portion, and
an arm part extending from said boss portion in a direction intersecting the master gear shaft; and a handle grip fitted on a tip of said handle arm unit, wherein:
the master gear shaft has a plurality of protuberances projecting axially outward from at least one end surface of the master gear shaft; and
said head portion includes a plurality of contact parts for contacting the plurality of protuberances of the master gear shaft, and a plurality of non-contact parts formed between said plurality of contact parts and notched so as not to come in contact with the plurality of protuberances.

11. A spinning reel handle assembly according to claim 1, wherein said hand shaft unit further includes
a cylindrical portion extending from said trunk portion, and a collar member coupled to an outer periphery of said cylindrical portion.

12. A spinning reel handle assembly according to claim 11, wherein
said cylindrical portion includes a male threaded portion which is larger in diameter than said first threaded portion, and
said collar member has female threaded portion such that said male threaded portion engages with said female threaded portion.

13. A spinning reel handle assembly according to claim 11, wherein:
a spring member is disposed between said boss portion and said collar member.

14. A spinning reel, comprising:
a reel unit having a spool shaft, a master gear shaft having a non-circular through hole, a master gear that rotates with said master gear shaft and engages with said spool shaft, and a handle assembly that includes
a handle shaft unit having
a head portion for interlocking with either end of said master gear shaft,
a trunk portion extending from said head portion, such that said trunk portion is non-circular and non-rotatively inserted into said non-circular through-hole of said master gear shaft, and
a first threaded portion formed on a tip of said trunk portion,
a handle arm unit having
a boss portion for interlocking with either end of said master gear shaft,
a second threaded portion formed in said boss portion for engaging with said
first threaded portion, and
an arm part extending from said boss portion in a direction intersecting said master gear shaft, and
a handle grip fitted on a tip of said handle arm unit;
a rotor rotatively supported at a front part of said reel unit so as to rotate about said spool shaft; and
a spool disposed on a front part of said rotor so as to be movable back and forth, said rotor being for winding fishing line around an outer peripheral surface of said spool.

15. A spinning reel according to claim 14, wherein
said first threaded portion is a male screw projecting from the tip of said trunk portion, and
said second threaded portion is female screw threads formed in said boss portion.

16. A spinning reel according to claim 14, wherein said through-hole and said trunk portion have a substantially polygonal cross-sectional shape.

17. A spinning reel according to claim 14, wherein
said handle assembly further includes a cushioning member disposed between said boss portion and said master gear shaft.

18. A spinning reel according to claim 14, wherein
said handle assembly further includes a cushioning member disposed between said head portion and said master gear shaft.

19. A spinning reel according to claim 14, wherein
said hand shaft unit further includes
a cylindrical portion extending from trunk portion, and
a collar member coupled to an outer periphery of said cylindrical portion.

20. A spinning reel according to claim 19, wherein
said cylindrical portion includes a male threaded portion which is larger in diameter than said first threaded portion, and
said collar member has female threaded portion such that said male threaded portion engages with said female threaded portion.

21. A spinning reel according to claim 19, wherein
said handle assembly further includes a spring member disposed between said collar member and said boss portion.

22. A spinning reel comprising:
a reel unit having a spool shaft, a master gear shaft having a non-circular through hole, a master gear that rotates with said master gear shaft and engages with said spool shaft, and a handle assembly that includes
a handle shaft unit having
a head portion for interlocking with either end of said master gear shaft,
a trunk portion extending from said head portion, such that said trunk portion is non-rotatively inserted into said non-circular through-hole of said master gear shaft, and
a first threaded portion formed on a tip of said trunk portion,
a handle arm unit having
a boss portion for interlocking with either end of said master gear shaft,
a second threaded portion formed in said boss portion for engaging with said first threaded portion, and
an arm part extending from said boss portion in a direction intersecting said master gear shaft, and
a handle grip fitted on a tip of said handle arm unit;
a rotor rotatively supported at a front part of said reel unit so as to rotate about said spool shaft; and
a spool disposed on a front part of said rotor so as to be movable back and forth, said rotor being for winding fishing line around an outer peripheral surface of said spool, wherein
said first threaded portion is female screw threads that open on the tip of said trunk portion, and
said second threaded portion is a male screw that protrudes from said boss portion.

23. A spinning reel comprising:
a reel unit having a spool shaft, a master gear shaft having a non-circular through hole, a master gear that rotates with said master gear shaft and engages with said spool shaft, and a handle assembly that includes
a handle shaft unit having
a head portion for interlocking with either end of said master gear shaft,
a trunk portion extending from said head portion, such that said trunk portion is non-rotatively inserted into said non-circular through-hole of said master gear shaft, and
a first threaded portion formed on a tip of said trunk portion,
a handle arm unit having
a boss portion for interlocking with either end of said master gear shaft,
a second threaded portion formed in said boss portion for engaging with said first threaded portion, and
an arm part extending from said boss portion in a direction intersecting said master gear shaft, and
a handle grip fitted on a tip of said handle arm unit;
a rotor rotatively supported at a front part of said reel unit so as to rotate about said spool shaft; and
a spool disposed on a front part of said rotor so as to be movable back and forth, said rotor being for winding fishing line around an outer peripheral surface of said spool, wherein:

said master gear shaft has a plurality of protuberances projecting axially outward from at least one end surface of said master gear shaft; and said head portion includes a plurality of contact parts for contacting the plurality of protuberances of the master gear shaft, and a plurality of non-contact parts formed between said plurality of contact parts and notched so as not to come in contact with said plurality of protuberances.

* * * * *